United States Patent [19]

Will

[11] Patent Number: 4,583,259
[45] Date of Patent: Apr. 22, 1986

[54] WIPER BLADE REFILL

[75] Inventor: Terry M. Will, Gary, Ind.

[73] Assignee: The Anderson Company of Indiana, Michigan City, Ind.

[21] Appl. No.: 682,152

[22] Filed: Dec. 17, 1984

[51] Int. Cl.$^4$ ............................................... B60S 1/38
[52] U.S. Cl. ................................................. 15/250.42
[58] Field of Search ......................... 15/250.36–250.42

[56] References Cited

U.S. PATENT DOCUMENTS

| | | | |
|---|---|---|---|
| 3,177,514 | 4/1965 | Wise | 15/250.42 |
| 4,009,503 | 3/1977 | Sharp . | |
| 4,156,951 | 6/1979 | Sharp . | |
| 4,177,538 | 12/1979 | Blaiklock et al. | 15/250.42 |
| 4,180,885 | 1/1980 | Thornton et al. . | |
| 4,389,747 | 6/1983 | Riester . | |

Primary Examiner—Peter Feldman
Attorney, Agent, or Firm—Wood, Dalton, Phillips, Mason & Rowe

[57] ABSTRACT

A refill unit for a windshield wiper blade having a resilient wiping element and a backing member with sidewardly extending flanges. A wiper blade superstructure has at least two articulated yokes or holders with claws on one of the yokes or holders engaging the flanges on said backing member. Abutments are struck from the walls of the body portion of the backing member for forming stops which engage the opposite ends of the wiping elements to prevent the wiping element from separating from the backing member. The abutments may be struck from the back of the backing member or from the sides of the backing member with the faces on the abutments facing toward the center of the blade.

3 Claims, 7 Drawing Figures

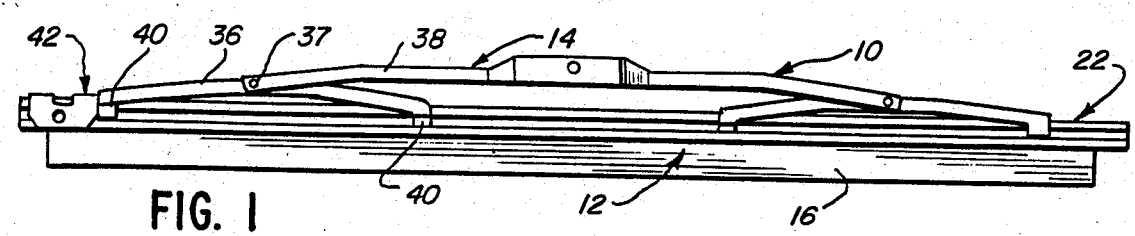
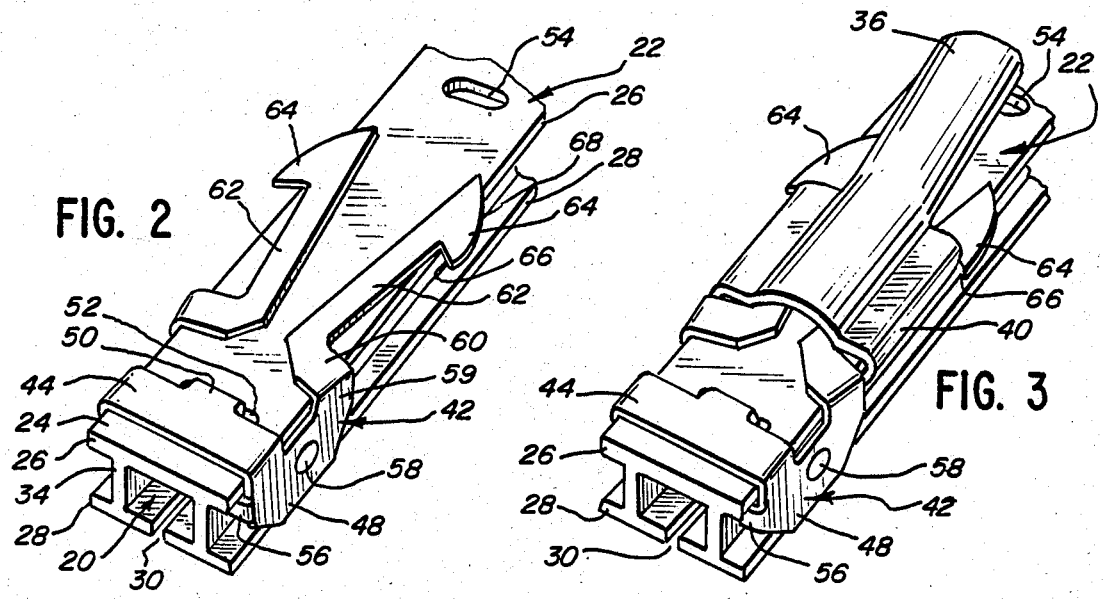
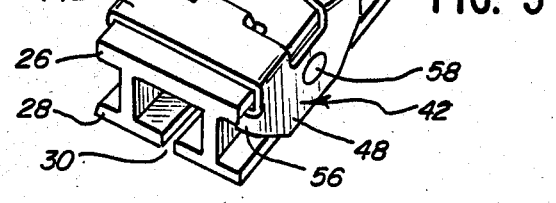
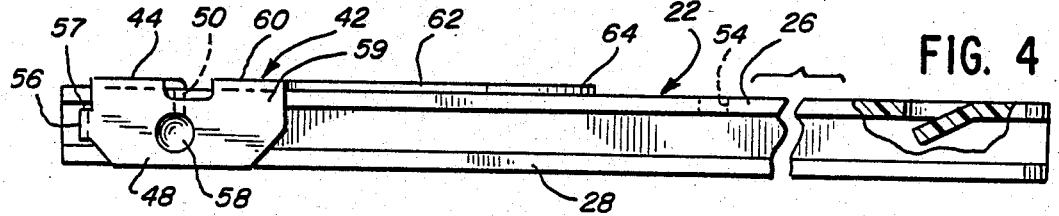
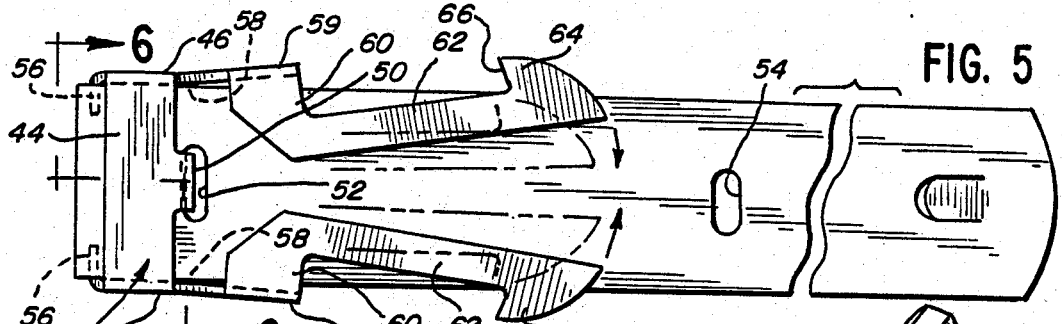
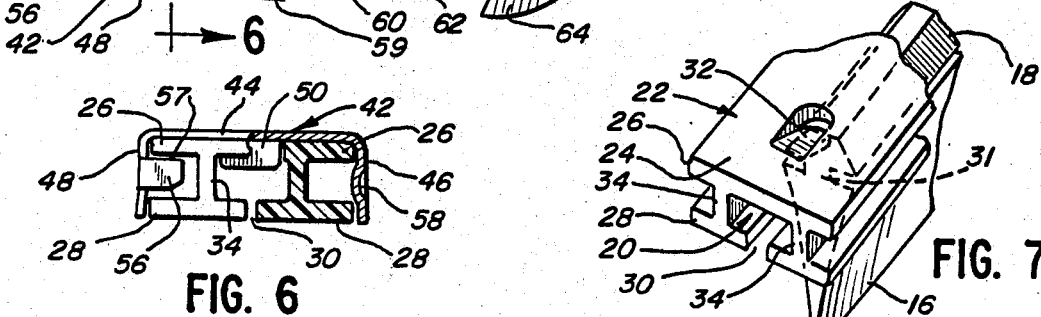
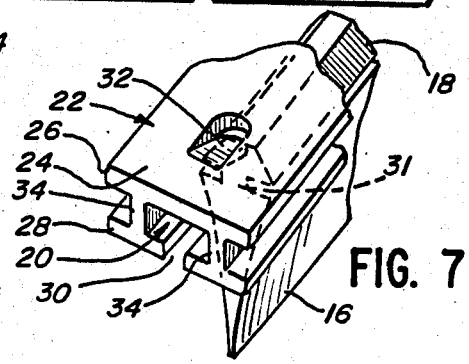

WIPER BLADE REFILL

DESCRIPTION

1. Field of the Invention

This invention relates to a refill for a windshield wiper blade and more particularly to a retainer for holding the wiping element assembled with the backing member.

2. Description of the Prior Art

Refills for wiper blades were first invented by John W. Anderson for use with his blade for wiping curved windshields (U.S. Pat. No. 2,596,063 issued May 6, 1952). Notable patents providing for refills are Anderson U.S. Pat. Nos. 2,757,403, 2,782,447 and 2,782,449. In the early refill patents, end clips were provided on the backing member and/or resilient wiping element which were either removed during assembly of the claws of the superstructure to the backing member or the claws of the superstructure were slid over the depressed end clip. In the intervening years since the late 50's dozens of different forms of refills and clips have been designed and patented, each one being generally to solve a particular problem.

In the early days of wiper blades for wiping curved windshields (U.S. Pat. No. 2,596,063), the backing strip was a thin strip of spring steel which seated in grooves in the sides of the wiping element and which backing strip received the claws of the superstructure. End clips were designed to interengage with the backing strip and resilient wiping element in maintaining its assembled relationship. Recently, the backing strips have been molded of plastic and have side flanges for the claws of the superstructure. Other means had to be devised to hold clips on the molded plastic backing strips especially prior to assembly with the superstructure. Many of the more recent patents address that problem, see for instance, Kimber et al U.S. Pat. No. 4,388,742, Sharp U.S. Pat. No. 4,156,951 and Sharp U.S. Pat. No. 4,442,566. Although the structure of these patents solved one or more existing problems, other problems developed as a result of the structure of the patent. For instance, the Sharp U.S. Pat. No. 4,442,566 structure put slots in the opposite edges of the flanges which weakened the support provided by the support member causing poorer wiping of the windshield and occasional failure of the support member. An additional problem with the molded backing strips is retention of the resilient wiping element to the backing strip. Existing systems use staking of the backing strip to the wiping element or the provision of separate removable end clips for retaining the backing strip on the wiping element.

THE INVENTION

A wiper blade is provided and has a refill including a resilient wiping element, a backing member have vertically spaced, outwardly directed flanges on each side, and which backing member has a channel for receiving a bead on the back of the wiping element, and a superstructure operatively connected to the backing member at spaced apart points. A novel abutment is formed in each end of the backing member to cooperate with the ends of the wiping element to hold the wiping element in assembled relation with the backing member.

In addition, a clip is provided for the refill that has a body portion, spaced side portions and an inturned lug on each side portion. A downturned tab is formed on the body portion with detents pointing inwardly from each side portion. A pair of legs extend forward from horizontal extensions of the side portions and lie in a plane substantially common with the plane of the body portion. Hook-like projections extend outward from the legs to provide overhangs with respect to the legs. The clip is assembled with the backing member at a appropriate location along its length where upon it is pivoted into position with the tab seated in one of the at least two apertures in the backing member. The outboard claws of the superstructure depress the hook-like projections until the claws clear the projections whereupon the superstructure is assembled with the refill.

The abutments in the backing member holds the resilient wiping element assembled with the backing member and the clip provides positive retention of the superstructure on the backing member without weakening the backing member and without effecting the quality of the wiping of the windshield. The clip is retained in a selected position along the backing member and can be simply relocated with a pivoting and sliding movement without disassembling the refill.

BRIEF DESCRIPTION OF THE DRAWINGS

These and further features and advantages of the clip arrangement of the present invention will made more apparent in the following description of the preferred embodiment taken together with the drawings in which:

FIG. 1 is a side elevational view of a wiper blade incorporating the clip arrangement of the present invention;

FIG. 2 is a perspective view of a refill having a clip in position thereon;

FIG. 3 is a perspective view similar to FIG. 2 only showing the end claws of a superstructure in engaging position with respect to the clip;

FIG. 4 is a partial side elevational view of the refill with a clip in place;

FIG. 5 is a top view of the refill and clip of FIG. 4;

FIG. 6 is a end view of the clip with part of the clip broken away and in section; and FIG. 7 is a perspective view of one end of the refill showing the abutment for holding the resilient wiping element assembled with the backing member.

BRIEF DESCRIPTION OF THE PREFERRED EMBODIMENT

A windshield wiper blade generally designated by the reference numeral 10 is shown in FIG. 1 and includes a wiper blade refill unit 12 and a pressure applying superstructure 14 operatively engaged with the refill unit. The wiper blade refill unit 12 includes a resilient wiping element 16 having a bead 18 on the back portion thereof which bead is seated in a channel 20 of a backing member 22. The backing member 22 has a body portion 24 with a pair of outwardly extending flanges 26,28 on each side thereof which flanges are vertically spaced apart. The lower flange 28 extends inwardly to define the chamber 20 and is spaced from the comparable inwardly extending flange 28 from the opposite side to form a slot 30 which receives the web 31 between the wiping element 16 and the bead 18 of the wiping element.

To retain the resilient wiping element 16 in the backing member 22 abutments or stops 32 are struck or formed downwardly from the plane of the back of the backing member 22 which abutments or stops 32 engage the opposite ends of the bead 18 to retain the wiping element in the backing member 22. The abutments face the midportion of the blade so as to prevent the trapped resilient wiping element from escaping from the channel 20. As an alternate to the abutment or stop 32, a pair of abutments 132 (FIGS. 4 and 5) may be struck in from the vertical webs 34 between the flanges 26,28 which likewise will abut against the ends of the bead 18 to retain the wiping element in the backing member. The abutments 132 are preferably struck from the spaced webs 34 in pairs to form two abutments on each end portion of the backing member for abutting the ends of and thereby retaining the wiping element on the backing member. The slope of the abutment or stop 32 permits the bead of the wiping element to be threaded in the channel 20 of the backing member where the bead will be deflected and compressed by the sloped abutment as the bead moves along the channel. When the end of the bead on the wiping element clears the abutment 32 it will be trapped between the two abutments of the backing member.

The superstructure 14 can be any one of the many well-known types currently on the market and includes at least two yokes or holders 36,38 which articulate relative to each other at pivots 37 with at least one of the yokes or holders 36 having pairs of oppositely disposed claws 40 on the ends thereof, which claws are adapted to wrap around the upper flanges 26 of the backing member 22. A wiper arm, not shown, engages the midportion of holder 38 and applies pressure to the superstructure 14. Pressure from the wiper arm will be distributed to the backing member and to the wiping element at a plurality of longitudinally spaced apart points below the claws 40. As shown, the superstructure 14 is comprised of two yokes or holders 36 pivotally carried by a bridge or holder 38. The yokes 36 have pairs of claws 40 on the opposite ends thereof.

To retain the superstructure 14 assembled with the backing member 22 of the refill unit 12, a clip 42 is provided. The clip 42 as best illustrated in FIGS. 4, 5 and 6 has a body portion 44 spanning the width of the backing member with spaced side portions 46,48 extending downwardly at right angles from the opposite sides of said body portion. The side portions are adapted to encase the outer edges of the flanges 26,28 of the backing member. A tab 50 is bent downwardly at a right angle from the middle of the body portion 44 and is adapted to engage in any one of a plurality of transversely oriented slots or apertures 52,54 formed transverse to the centerline of the back of the body portion 24 of the backing member 22. Which slot or aperture 52,54 will be selected for attachment to the clip 42 will be explained in greater detail hereinafter. One end of the sides 46,48 of the clip have lugs 56 bent inwardly at right angles to the sides 46,48 and project toward each other as best shown in FIGS. 4 and 6. The top surface 57 of the lugs 46 (FIG. 6) are spaced from the plane of the body portion 44 by an amount slightly larger than the thickness of the flanges 26 on the backing member 22. The midportion of the sides 46,48 have inwardly struck detents 58 with the upper extremes of the detents 58 being spaced from the body portion 44 by an amount substantially equal to the thickness of the flanges 26. The detents 58 project inwardly into the space between the side walls 46,48. The front portions 59 of the sides 46,48 project forwardly of the body portion 44 and have inturned plates or horizontal projections 60 lying in a plane substantially common with the plane of the body portion 44. A pair of legs 62 extend forwardly of the plates 60 and at the outer end thereof have sidewardly directed hook-shaped parts 64 which defines an abutment surface 66 spaced from the edges of the plates 60 by an amount slightly greater than the longitudinal lengths of the claws 40 on the superstructure. The portions 59 of the sides 46,48 are biased, bent or flared outwardly along a line substantially aligned with the body portion 44 so as to position the hook-shaped parts 64 outward of the plane of the outer edges of the flanges 26,28.

The refill unit 12 which is comprised of the resilient wiping element 16 and the backing member 22 with the resilient wiping element held in place in the backing member by the abutments 32 struck from the backing member 22 and is supplied with a clip 42 which can be assembled with an appropriate aperture 52 or 54 on the backing member 22 so that the wiping element or refill can be assembled with superstructures 14 of different dimensions.

To assemble the clip 42 on the backing member, the lugs 56 are threaded into the open spaces between the flanges 26,28 with the body 44 of the clip pointing at an approximate 45° angle to the plane of the backing member 22. The clip 42 is moved along the longitudinal length of the backing member 22 until the selected position is located. Thereupon the clip 42 is pivoted about the top edge of the lugs 56 to move the legs 62 toward the backing member 22 with the tab 50 aligned with the appropriate aperture, for instance, aperture 52, whereupon downward pressure on the leg end of the clip will urge the detents 58 against and ultimately over the flanges 26 as the tab 50 enters the aperture 52. The detents 58 will hold the clip from pivoting away from the backing member 22 with the lugs 56 and tab 50 likewise positioning the clip at the appropriate selected position of the backing member. The detents 58 and lugs 56 prevent the clip from being easily removed from the backing member with the tab 50 preventing the clip from moving longitudinally along the length of the backing member. With the clip in position, the hook-shaped parts 64 on the legs 62 will extend sidewardly beyond the planes of the edges of the flanges 26,28. The claws 40 of a superstructure are threaded onto the top flange 26 of the backing member 22 and are threaded substantially the full length of the refill until the outboard claws 40 engage against the curved or sloped leading edge 68 of the hook-shaped parts 64. Further longitudinal pressure on the superstructure relative to the refill will depress the hook-shaped members 64 and legs 62 to permit the claws to pass the high point of the hook-shaped member and seat between the abutments 66 and the forward facing edge of the plates 60. The resilience of the clip will force the hook-shaped elements 64 and legs 62 sidewardly so as to affect a locking action to hold the claws on the superstructure assembled with the refill unit.

The length of the blade or refill 12 with respect to the superstructure 14 will determine the location of the clip 42 along the length of the backing member 22.

The legs 62 and hook-shaped parts 64, as viewed in FIG. 4, are biased downwardly slightly out of the plane of the body portion 44 and plates 60. In this way, with the clip in position, the legs 62 and hook-shaped parts 64 will be urged against the top surface of the backing member 22 which somewhat limits accidental removal of the clip from the refill due to stray elements gettting into the space between the hook-shaped member 64 and the backing member which then can be lifted to remove the clip.

The refill element is usable with many different lengths of superstructures and when connected with the superstructure is positively retained in position thereon and has the ability to permit the blade to flex without restraint by providing apertures or slots in the midportion of the backing 22. The backing member is not weakened and is not likely to fail. Accordingly, the pressure when applied to the backing member will be evenly and uniformly distributed to the wiping element according to the relative locations of the pressure points along the length of the refill. The refill can be removed and replaced by depressing the hook-shaped parts 64 and legs 62 until the claws in the superstructure can be move over the hook-shaped parts 64 and slid the length of the refill.

I claim:

1. A windshield wiper refill having an elongate wiping element with first and second free ends and a backing member, the backing member having a body portion, a retention chamber, first and second substantially co-planar flange pairs extending outwardly from said body portion, and first and second spaced, vertical webs each extending between the first and second flange pairs, the wiping element having a retention based seat in the retention chamber, the improvement comprising abutment means struck from at least one of the webs into the retention chamber at locations on the body portion spaced apart further than the length of the wiping elements for interfering with the ends of the wiping element to thereby restrict lengthwise movement of the wiping element relative to the backing member.

2. A windshield wiper refill as claimed in claim 1 wherein a leading edge of each abutment means is engageable with a free end of the bead on the wiping element.

3. The windshield wiper refill as claimed in claim 1 wherein said abutment means are pairs of abutments struck inwardly toward each other in the first and second webs of the body portion to form two abutments on each end portion of the backing member for abutting and retaining the wiping element on the backing member.

* * * * *